Aug. 24, 1954  C. GILMAN  2,687,066
MACHINE AND METHOD FOR MAKING VALVE BAGS
Filed June 26, 1951  11 Sheets-Sheet 2

INVENTOR.
CHARLES GILMAN.
BY Percy Freeman
ATTORNEY

Aug. 24, 1954     C. GILMAN     2,687,066
MACHINE AND METHOD FOR MAKING VALVE BAGS
Filed June 26, 1951     11 Sheets-Sheet 3

INVENTOR.
CHARLES GILMAN.
BY Perey Freeman
ATTORNEY.

Aug. 24, 1954             C. GILMAN             2,687,066

MACHINE AND METHOD FOR MAKING VALVE BAGS

Filed June 26, 1951                                         11 Sheets-Sheet 4

INVENTOR.
CHARLES GILMAN
BY
Percy Freeman
ATTORNEY.

Aug. 24, 1954   C. GILMAN   2,687,066
MACHINE AND METHOD FOR MAKING VALVE BAGS
Filed June 26, 1951   11 Sheets-Sheet 5

INVENTOR.
CHARLES GILMAN.
BY
*Percy Freeman*
ATTORNEY.

Aug. 24, 1954  C. GILMAN  2,687,066
MACHINE AND METHOD FOR MAKING VALVE BAGS
Filed June 26, 1951  11 Sheets-Sheet 6

INVENTOR.
CHARLES GILMAN
BY
*Perey Freeman*
ATTORNEY.

Aug. 24, 1954          C. GILMAN          2,687,066

MACHINE AND METHOD FOR MAKING VALVE BAGS

Filed June 26, 1951          11 Sheets-Sheet 7

INVENTOR.
CHARLES GILMAN
BY
*Percy Freeman*
ATTORNEY.

INVENTOR.
CHARLES GILMAN.

Patented Aug. 24, 1954

2,687,066

UNITED STATES PATENT OFFICE 2,687,066

MACHINE AND METHOD FOR MAKING VALVE BAGS

Charles Gilman, New York, N. Y., assignor to Kraft Bag Corporation, New York, N. Y., a corporation of New York Application June 26, 1951, Serial No. 233,628

4 Claims. (Cl. 93—8)

This invention relates to a valve bag and to a machine and a method for making the same.

Valve bags are used by manufacturers of cement, fertilizer and similar products in the following manner: The cement or fertilizer is poured into the bag through the valve and the filled bag is then dropped upon the floor or upon a similar horizontal surface. The impact causes a sudden current of air to flow outwardly through the valve and the valve is so arranged that it is caught by the air current and thereby caused to close. The bag is now ready for storage or shipment.

All valve bags known to applicant are provided with gussets or inwardly turned folds along their respective side edges. The valve is formed at the top of one of said gussets or folds. Valve bags without side gussets or folds have heretofore been unknown.

It is one of the principal objects of this invention to provide a gussetless valve bag of the character described.

It is another principal object of this invention to provide a machine for making gussetless valve bags from tubular stock. Valve bags are generally, perhaps invariably, made of paper in several layers or plies. In the initial stages of making valve bags of the character under discussion, long, multiwalled or multi-plied tubes are formed, and these tubes are then cut to predetermined lengths. Each length becomes a bag. It is one of the objects of this invention to provide a machine which is capable of making valve bags from these predetermined lengths of multi-walled or multi-plied paper tubing.

It is a corollary object of this invention to provide a method of making gussetless valve bags from these predetermined lengths of multi-walled or multi-plied paper tubing. This method comprises the steps of closing off the two ends of each length of tubing and at the same time forming the valve in one of said closed ends.

The invention is illustrated in the accompanying drawings, in which.

The bag-making machine which is shown in the drawing may best be described in terms of its several operations, and these operations may best be described in terms of their results. Referring, therefore, to Figs. 2 to 10 of the drawings, it will be seen that a multi-walled or multi-plied paper tube 40 is provided, of predetermined length. The length of the tube corresponds, substantially, to the length of a single bag. It will be noted that this tube may be folded flat upon itself, along side folds 42 and 44, respectively. There are no gussets or other inwardly turned folds in the sides of this tube. The bottom end 46 of the tube is cut off straight, that is, perpendicular to the folded side edges 42 and 44. The upper end is stepped to form straight edges 48 and 50, respectively, which are parallel to but offset from each other, providing a shoulder 48a. Straight edge 48 projects forwardly or upwardly a predetermined distance beyond straight edge 50. A small tab 52 is formed along straight edge 50, on one side of the tube. It will also be noted that a plurality of holes 54 are formed in the tube in parallel relation to side edge 42. These holes are formed in the process which leads up to the making of tube 40 and they have no significance in the process which is herein claimed.

Figure 4:
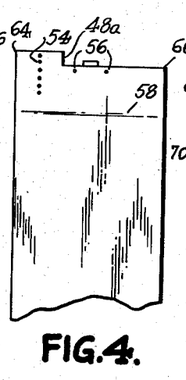
Fig. 4 is a view similar to that of Fig. 3, but showing an additional step in the progress of making the gussetless valve bag, said step comprising the formation of a transverse crease line or folding line in said predetermined length of tubing.
Figure 5:
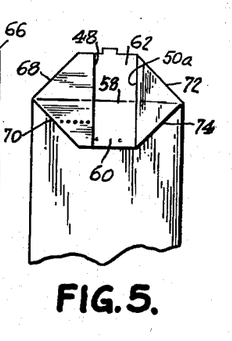
Fig. 5 is another plan view, showing a further step in the process of making the bag, said step comprising the folding over of one side wall of said length of tubing on the folding line shown in Fig. 4, and simultaneously therewith, the folding over of the two corners of the top end of said length of tubing.

Holes 56, however, are formed in the course of the process herein claimed and their significance will be discussed in connection with those elements of the machine which provide them. In the first important step of the claimed process, a transverse crease line or folding line 58 is formed in the tube a predetermined distance below and parallel to top edge 50. In the next step of the process, the front wall 60 of the tube is folded back upon itself along folding line 58. The other wall 62 of the tube is retained in unfolded position. Hence, the corners 64 and 66 of the tube are folded over upon both walls 60 and 62, as shown in Fig. 5. Top edge 48 is thereby caused to fall over upon a line which is parallel to both side edges 42 and 44, as Fig. 5 clearly shows. A part of edge 50 also falls upon a parallel line which is indicated in Fig. 5 by means of the reference character 50a. In a succeeding step of the process, folded edges 68 and 70 are pressed or creased to emphasize and perpetuate said folds but folded edges 72 and 74 are not creased because these folds are intended to be temporary. The next step involves scoring and further emphasizing crease 42a, which, in the initial stages of the process, constituted a part of folded edge 42. Actually, what is done is to reverse the direction of the fold since if edge 42 be considered to be folded outwardly, crease 42a may be considered to be folded or scored inwardly. Crease 42a extends into wall 62 of the tube as Fig. 26 clearly shows, but it ends along edge 48 as that edge is disposed in Fig. 6.

Figures 6, 7, 8, 9, 10, 11:
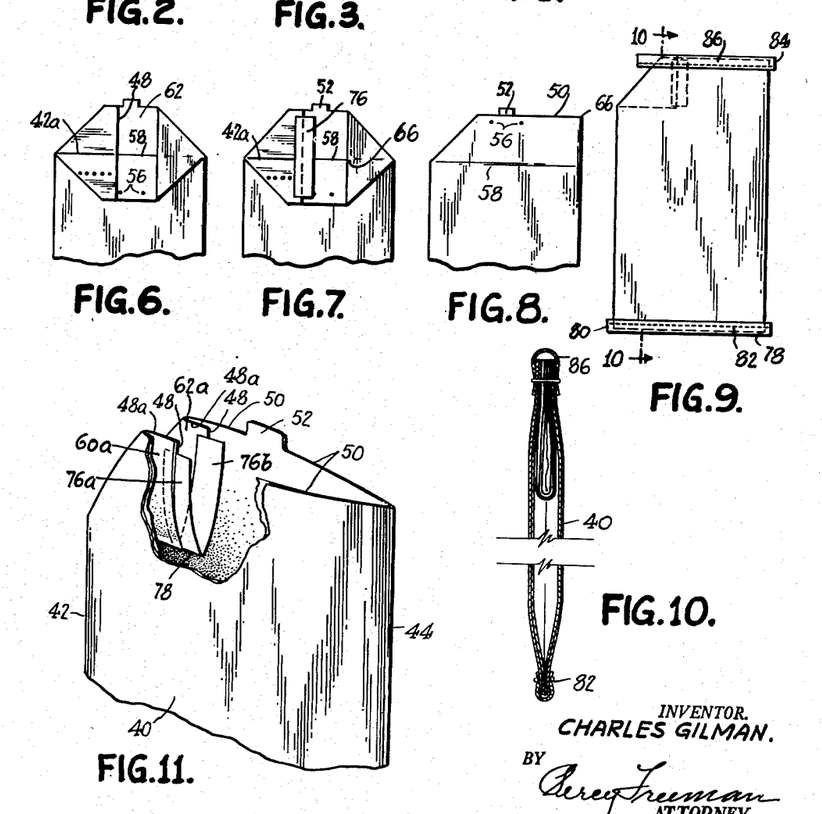
Fig. 6 is a view similar to that of Fig. 5, showing still another step in the process of making the bag, said step comprising the provision of a transverse crease adjacent one of the folded corners of the tube.
Fig. 7 is a view similar to that of Fig. 6, showing the next step in the process of making the bag, said step comprising the affixing of a valve flap to said folded and creased corner of the tube.
Fig. 8 illustrates a further step in the bag-making process, wherein the folded side of the tube is brought back into superimposed position relative to the unfolded side of the tube and wherein the folded but uncreased corner of the tube is simultaneously opened up into unfolded position.
Fig. 9 illustrates the final step in the making of the bag, wherein both ends of the bag are closed off with suitable tape. The valve construction is complete but it remains open.
Fig. 10 is an enlarged section on the line 10—10 of Fig. 9.
Fig. 11 is an enlarged fragmentary view in perspective of the top end of the valve bag before said end is closed off, showing the valve construction.

Fig. 7 illustrates the next step in the process, and it will there be seen that a gummed valve flap 76 is secured to the top of the tube along edge 48, as that edge is shown to be disposed in Fig. 6 and Fig. 7. It will be apparent, therefore, that valve flap 76 extends in parallel relation to side edge 42 and that it is intersected at right angles, centrally thereof, by crease line 42a. In the next stage of the bag making process herein claimed, the folded portion of wall 60 is swung back into parallel and overlying position relative to wall 62. Simultaneously therewith, folded corner 66 is blown outwardly to its original unfolded position, as shown in Figs. 2, 3, 4 and 8. Corner 64, which may be described as the valve corner, remains in its inwardly folded position, being folded along fold lines 68 and 70 and crease line 42a. Folds 68 and 70 are turned upwardly whereas fold or crease 42a is turned inwardly. It will be noted in Fig. 11 that valve flap 76 is also folded along a line 78 which coincides with crease line 42a.

The final steps in the bag-making process now take place. A tape or binding 80 is folded over upon itself and upon bottom edge 46 of the tube, and it is secured thereto by means of a suitable cement as well as by means of stitching 82. It will be borne in mind that the tube is still in flat position with its walls 60 and 62 disposed flat against each other. The folded tape or binding 80 receives the lower edges of both walls 60 and 62 of the tube within its fold so that it may be secured to both walls of the tube at the same time. The tube is now closed at the bottom. A similar tape or binding 84 is folded over upon itself and upon the top edge 50 of the tube. Again, cement is used and stitching 86 to securely fasten said tape or binding to the top of the tube and that, of course, includes the top ends of both walls 60 and 62. It will be noted in Fig. 9 that stitching 86 engages the top ends of folded corner 64 and folded flap 76. The bag is now complete and ready for the filling operation.

In order to fill the bag with cement or fertilizer, or the like, the bag is held in the position which it is shown to occupy in Fig. 9, and is slid over and suspended from a filling spout or nozzle which extends into the bag through its open valve which is best shown in Fig. 11. This valve may best be described in terms of the walls which define it. On one side is wall 60a which is simply the inwardly turned corner of wall 60. On the other side is wall 62a which constitutes the inwardly turned corner of wall 62. A temporary extension of wall 62a is flap portion 76a. A temporary extension of wall 62a is flap portion 76b. The valve opening is the space between walls 60a and 76a on the one hand, and walls 62a and 76b, on the other hand. Crease or fold 42a and fold 78 close off the bottom of the valve. Stitching 86 closes off the top of the valve. At the conclusion of the filling operation, the filled bag is withdrawn from the spout or nozzle and the bag is then dropped upon the floor or upon any other suitable horizontal surface. The bottom of the bag to which binding 80 is affixed strikes the horizontal surface in the first instance, and it is brought up to a sharp halt. A sudden rush of air is thereby generated within the bag, the direction of the air current being upward and toward the valve opening. The air catches valve walls 60a and 62a and valve flap 76. The effect of this sudden rush of air is to blow valve walls 60a and 62a outwardly as far as they are able to go and, at the same time, the valve flap is crushed into sealing position relative to the space or opening between said valve walls. What actually happens, in effect, is that the valve walls and the valve flap are blown and crushed outwardly at the same moment to close and seal the valve opening. The bag proper is made of several plies of relatively stiff paper but the valve flap is simply a single sheet or strip of relatively thin, pliant paper. The valve flap, therefore, not only helps catch the sudden rush of air, but it also serves as a seal for the valve under discussion.

Figure 2:
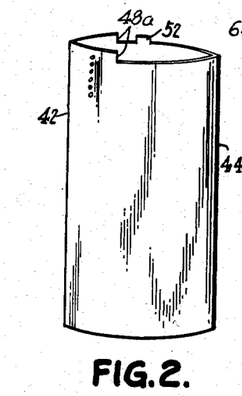
Fig. 2 is a perspective view of one of the predetermined lengths of multi-walled paper tubing out of which a single gussetless valve bag in accordance with this invention may be made.
Figure 3:
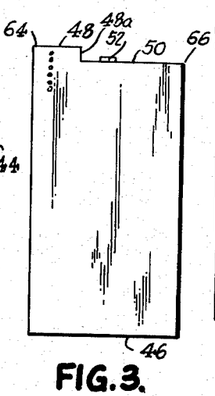
Fig. 3 is a plan view thereof.

Referring now to the machine 100 on which the valve bag above described is made, it will be seen that this machine is provided with a frame 102 on which all of the working parts hereinafter mentioned are mounted. Supported by the frame is a table surface 104 on which tube 40, as shown in Figs. 2 and 3, is initially placed. Guide walls 106 are provided on both sides of the table to engage side edges 42 and 44 of the tube and to keep the tube in longitudinal alignment with the machine. Table legs 108 may be provided to help support the table.

Figure 1:
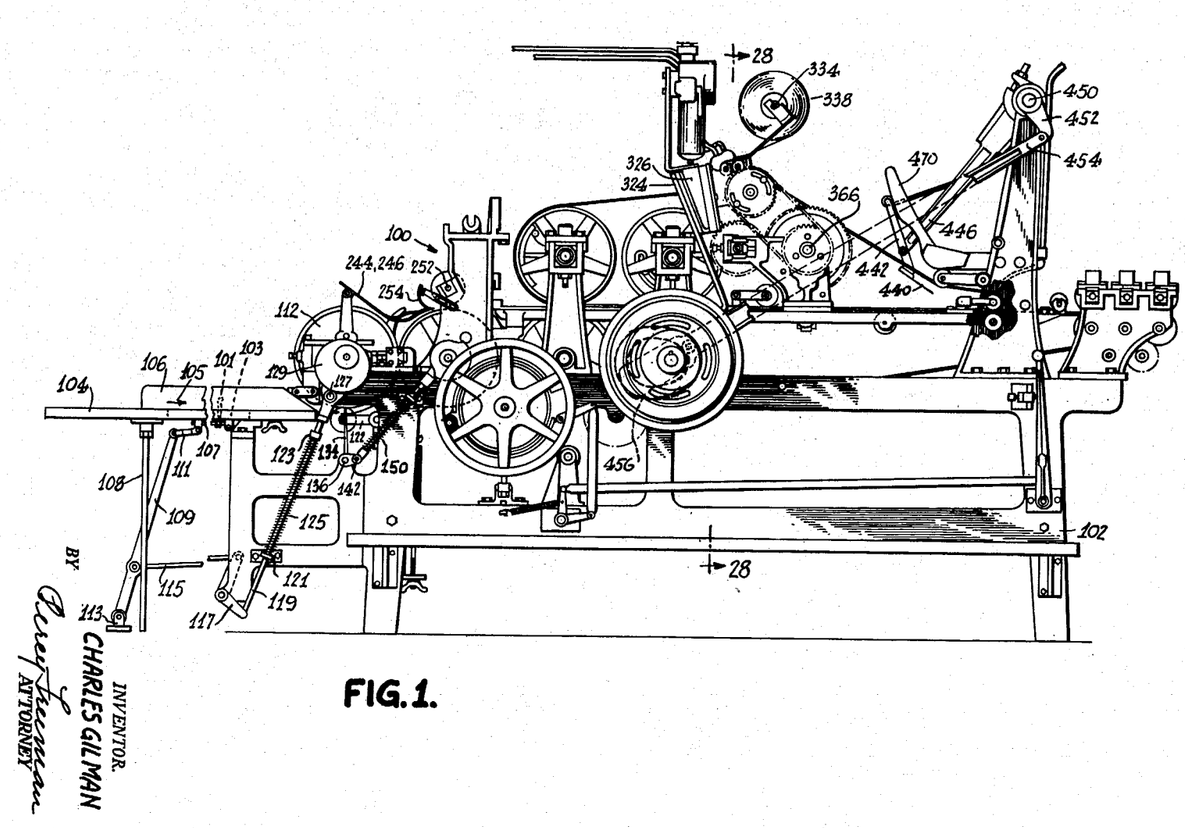
Fig. 1 is a side view of a machine for making gussetless valve bags in accordance with the present invention.

Tube 40 may be fed manually or by mechanical means. Fig. 1 shows a feeding mechanism which may be employed in connection with the bag-making machine herein claimed. This mechanism includes a tube pusher or finger 101 which projects upwardly through a longitudinal slot 103 formed in table 104. When this pusher or finger moves forwardly, that is in the direction of arrow 105, it pushes the tube into the operative parts of the machine which will hereinafter be described. Finger 101 is supported by a slidably mounted rod 107 which is connected to bar 109 by means of link 111. Bar 109 is pivotally mounted on a bracket 113 which rests on the floor. A pull-and-push rod 115 is pivotally secured at one end to bar 109 and at its opposite end to a bell crank 117. The bell crank is also connected to a rod 119 which is slidably mounted in bearing 121. A collar 123 is fixed to rod 119 and mounted between said collar and bearing 121 is a compression spring 125 which urges or thrusts the rod upwardly as viewed in Fig. 1. At the upper end of rod 119 is a cam follower 127 which engages a rotating cam 129. When the cam follower is in engagement with the high side of the cam, rod 119 is thrust downwardly against the action of spring 125, and it causes bell crank 117 to engage in clockwise movement. Since the bell crank is linked to rod 109 by means of rod 115, and since rod 109 is linked to rod 107 by means of link 111, this clockwise movement of the bell crank causes rod 109 and rod 107 to move forwardly, that is, rightwardly as viewed in Fig. 1. And since finger 101 is mounted on rod 107, this forward movement of said rod will cause the finger to move forwardly and to push tube 40 forwardly with it. When cam follower 127 engages the low side of cam 129, spring 125 is enabled to thrust rod 119 upwardly and thereby to cause bell crank 117 to turn in counter-clockwise direction. Rod 115, bar 109, rod 107 and finger 101 are thereby thrust backwardly (leftwardly as viewed in Fig. 1) preparatory to receiving and pushing the next tube 40 forwardly.

Figure 12:
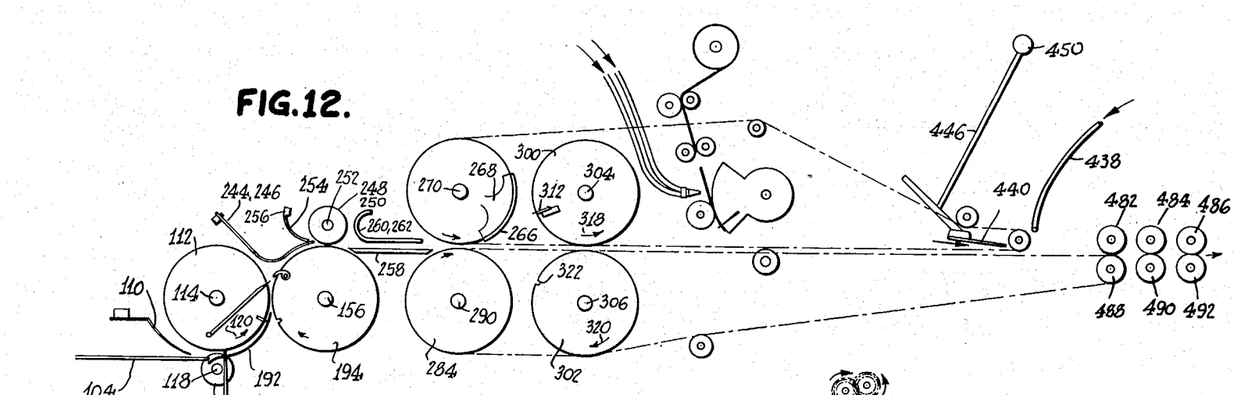
Fig. 12 is a diagrammatic view of the bag-making machine.
Figures 14, 15:
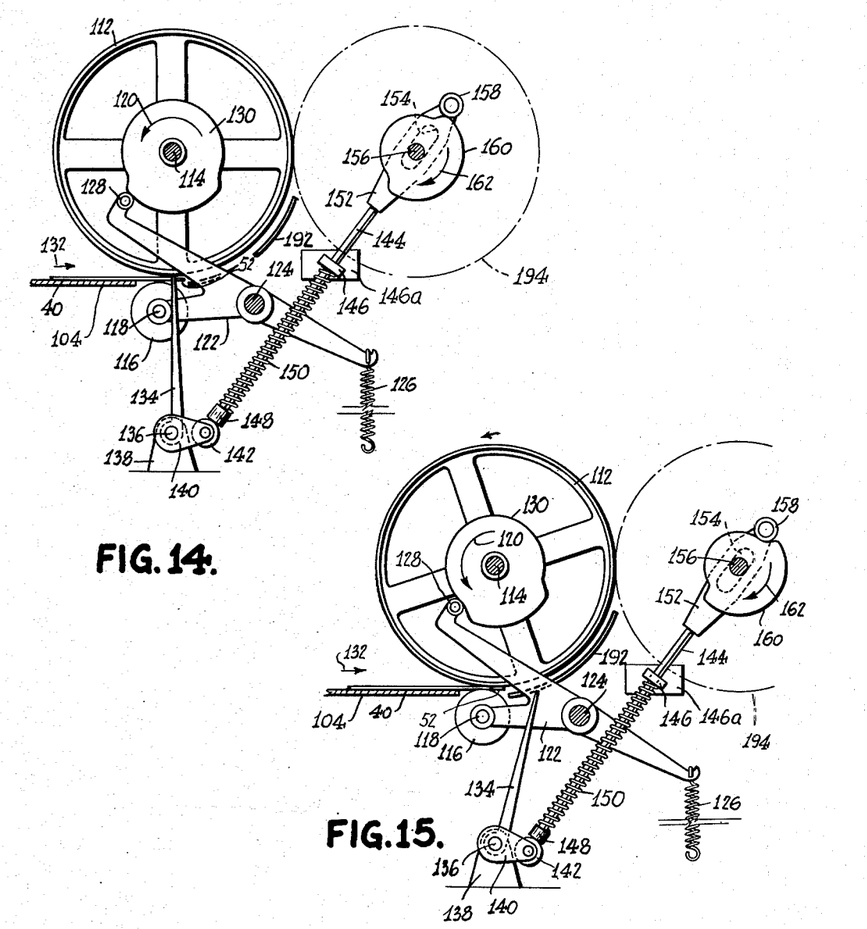
Fig. 14 is a view of the first section or component of the bag-making machine which receives, opens and feeds the paper tubes to the other operative parts or sections of the machine.
Fig. 15 is a similar view showing the first section or component of the machine in a different position, between tube feeding operations.

The first operative parts of the machine that the tube encounters are best shown in Figs. 12, 14 and 15. It will be noted in Fig. 12 that spring fingers 110 engage wall 60 of the tube and tensionally press the tube flat against table 104. The tube is then fed between roller 112 mounted on a shaft 114 and resilient roller 116 mounted on shaft 118. Shaft 114 rotates in the direction of arrow 120. Shaft 118 is supported on a rocker arm 122 which is pivotally mounted on a shaft 124. At one end of rocker arm 122 is a tension spring 126 which tends to pull that end of the rocker arm downwardly and, hence, to turn the arm in clockwise direction about shaft 124. The opposite end of rocker arm 122 supports a cam follower 128 which rides on a cam 130. Cam 130 is fixed to shaft 114 and, hence, it rotates with said shaft in the direction of arrow 120. Tube 40 is fed between the two rollers 112 and 116 in the direction of arrow 132. When the cam follower rides on a low part of cam 130, as shown in Fig. 15, spring 126 urges roller 116 to swing upwardly against the tube and to press the tube against roller 112. Since roller 112 is fixed to shaft 114, it tends to carry the tube forwardly in further movement in the direction of arrow 132.

Pins 134 serve as stop members with respect to tube 40 to prevent the tube from moving forwardly beyond a predetermined point until a predetermined time. These stop pins are fixedly mounted on a shaft 136 which is supported by brackets 138. Also fixed to shaft 136 is a pair of arms 140 which pivotally support a roller 142. Engaging the roller 142 is a rod 144 which rides in a bearing 146 secured to the machine frame 146a. More specifically, it is a head 148 at the lower end of rod 144 which rests against said roller 142. Between head 148 and bearing 146 is a compression spring 150 which urges said head 148 into pressure engagement with roller 142.

Attached to the opposite end of rod 144 is a member 152, having a slot 154 which accommodates a shaft 156. Within the limitations of slot 154, rod 144 is free to move longitudinally of itself relative to said shaft 156.

A cam follower 158 is mounted on member 152, and it will be noted that said cam follower engages a cam 160. Cam 160 is fixed to shaft 156 and both the cam and the shaft rotate in the direction of arrow 162. When cam follower 158 rides on the high side of cam 160, rod 144 is thrust upwardly against the action of compression spring 150. This removes the pressure of rod 144 on roller 142 and arms 140, shaft 136 and stop pins 134 are now free to pivot in counter-clockwise direction to the extent that rod 144 will allow (Fig. 15). This counter-clockwise movement may be effected by means of counterweights or a torsion spring or the like, not shown. The stop pins are now brought to their Fig. 14 positions, which are their operative positions. When cam follower 158 rides on the low side of cam 160, spring 150 is free to thrust rod 144 downwardly and against roller 142. Since said roller is mounted on arms 140 which are fixed through shaft 136 to stop pins 134, this downward thrust of rod 144 will cause the arms and stop pins to swing in clockwise direction about the axis of shaft 136. The stop pins are thereby brought to their inoperative positions illustrated in Fig. 15.

There is no mechanical link between rocker arm 122 and the stop pin actuating mechanism last above described. The rotation of cam 130 is, however, synchronized with the rotation of cam 160, so that the movements of the stop pins are synchronized with the action of said rocker arm. Thus, when stop pins 134 are in their upright, operative positions of Fig. 14, roller 116 is in its lower, inoperative position with respect to roller 112. Hence, a space is provided between these two feed rollers to accommodate paper tube 40 as Fig. 14 clearly shows. The tube may be pushed forwardly only as far as stop pins 134 will allow. By the same token, when the stop pins move to their canted inoperative positions of Fig. 15, roller 116 moves upwardly into its operative position with respect to tube 40 and roller 112. Sufficient tensional force is thereby applied to the tube to cause it to move forwardly in the direction of arrow 132 under the influence of roller 112.

Referring now to Figs. 16 to 22, inclusive, it will be seen that roller 112 is a hollow roller or cylinder which contains within its own confines a tube-gripping mechanism which engages the tube and carries it forwardly. This tube-gripping mechanism includes a pair of pointed pins 170 which are supported by a bracket 172. This bracket is fixed to shaft 114, so that it rotates integrally with said shaft and with roller 112 which is also fixedly secured to said shaft. Bracket 172 is provided with arms 174 in which pointed pins 170 are slidably mounted. The pointed ends of these pins project in the direction of the periphery of the roller along lines which may be described as chords relative to said periphery. The opposite ends of the pointed pins are provided with heads 176 and mounted on said pins between their said heads and adjacent arms 174 of the bracket are compression springs 178. These compression springs tend to urge the pointed pins backwardly and to retract their pointed ends from the periphery of the roller.

Roller 112 is provided with openings 180 through which the pointed ends of pins 170 may be thrust against the action of springs 178. A bracket 182 is secured to the inside of roller 112 adjacent the headed ends of pointed pins 170. A bell crank 184 is pivotally mounted on bracket 182 at 183. One end of said bell crank engages the heads of the pointed pins. The opposite end of the bell crank supports a cam follower 186 which rides upon a fixed cam 188. As roller 112 rotates in the direction of arrow 190 in Fig. 16, the bell crank is caused to engage in a rocking movement by reason of the engagement of its cam follower 186 with fixed cam 188. Since the opposite end of the bell crank engages the headed ends of the pointed pins, this rocking movement is transmitted to the pins and causes them to engage in reciprocating movement axially of themselves. The bell crank thrusts them forward through openings 180 and springs 178 thrust them backwardly, the forward thrust taking place when cam follower 186 engages the high side of cam 188 and the backward thrust taking place when said cam follower rides on the low side of said cam.

Figures 19, 20, 21:
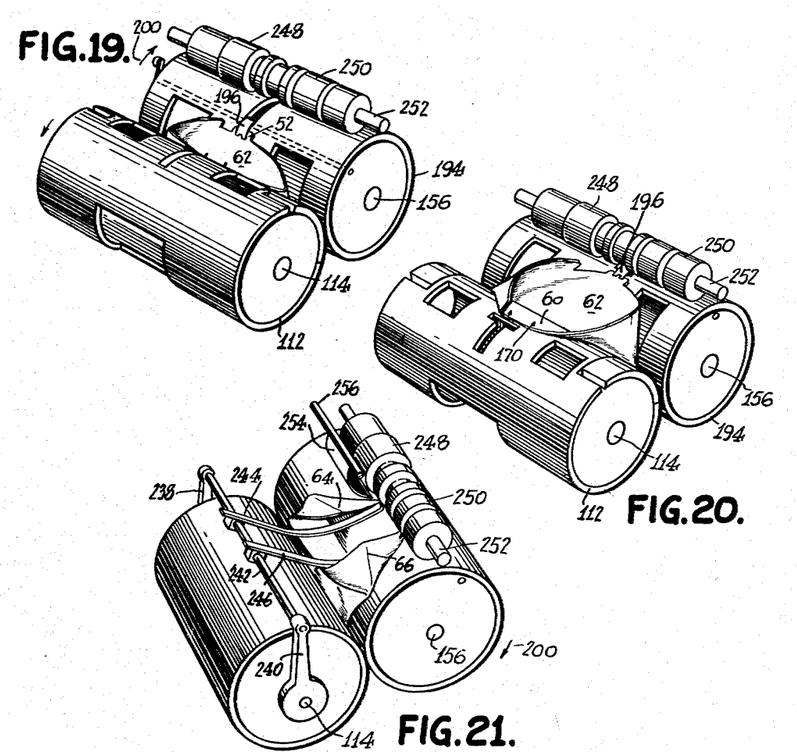
Fig. 19 is a perspective view of the same components shown in Figs. 16, 17 and 18, showing the tube in process of being opened up at the top preparatory to the folding operation, resulting in the stage illustrated in Fig. 5.
Fig. 20 is a similar view, showing the tube being opened still further and showing the top corners of the tube, beginning to fold inwardly.
Fig. 21 is still another similar view, showing the top of the tube completely opened up and showing a pair of pressure fingers completing the operation of folding over the top of one side wall of the tube.

The action of pins 170 is shown in Figs. 19 and 20. It will there be seen that when the pins are thrust forwardly through openings 180, they engage the top of side wall 60 of paper tube 40. Holes 56 shown in Fig. 4 are the pinholes which result from the engagement of these pointed pins with side wall 60. The pins project forwardly to engage the tube as it passes between rollers 112 and 116, as shown in Fig. 15. What actually takes place is that the rotation of rollers 112 and 116 in frictional engagement with the tube carries the tube forward and feeds it to pointed pins 170 which then continue the process of carrying the tube forwardly. Since the pointed pins are mounted on a rotating bracket which turns in the direction of arrow 190 in Fig. 16, there is an upward component to the forward movement of the tube. An upwardly curved ramp 192 (Figs. 12, 14 and 15) assists the pointed pins in carrying the tube upwardly and into the space between rollers 112 and 194 which cooperate with each other in the manner hereinafter explained.

It has been stated that pointed pins engage side wall 60 of the tube. It may be desired that said pins engage both side walls of the tube, at least in the initial stages of the operations, which rollers 112 and 194 perform. Thus, it may be desired that said pointed pins engage both side walls of the tube in order to facilitate carrying the tube forwardly and upwardly to the point where the two side walls 60 and 62 of the tube are pulled apart from each other at their respective upper ends. When that point is reached, side wall 62 slips off the ends of the pointed pins and said pins then carry side wall 60 alone, to and through the positions of said side wall which are shown in Figs. 19 and 20.

When the top or leading end of the tube is carried up into engagement with roller 194, tab 52 on side wall 62 slips under a gripper 196 which is pivotally mounted on roller 194. Roller 194 is fixed to shaft 156 and said shaft and said roller rotate in the direction of arrow 200, shown in Fig. 16. When tab 52 slips under said gripper 196, the gripper acts upon said tab to grip it against roller 194, and since said roller rotates in the opposite direction from the direction of rotation of roller 112, the effect of such gripping action upon the tab of the tube is to pull side wall 62 of the tube off pointed pins 170 and to carry said side wall 62 to and through the positions which it is shown to occupy in Figs. 19 and 20.

Since side wall 60 is engaged by pins 170 on roller 112 and since side wall 62 is engaged by gripper 196 on roller 194, the effect is to open up the top of the tube in the manner shown in Figs. 19 and 20.

Figure 16:
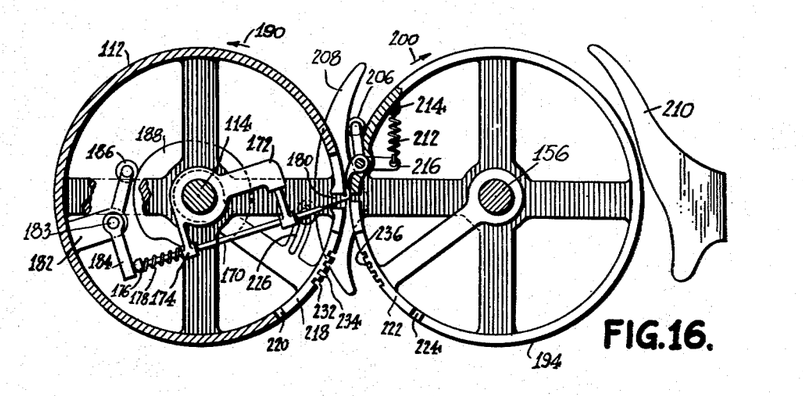
Fig. 16 is a section through the same component of the machine, showing the gripping means by which the top end of the tube is opened up preparatory to the folding operations which follow.
Figure 17:
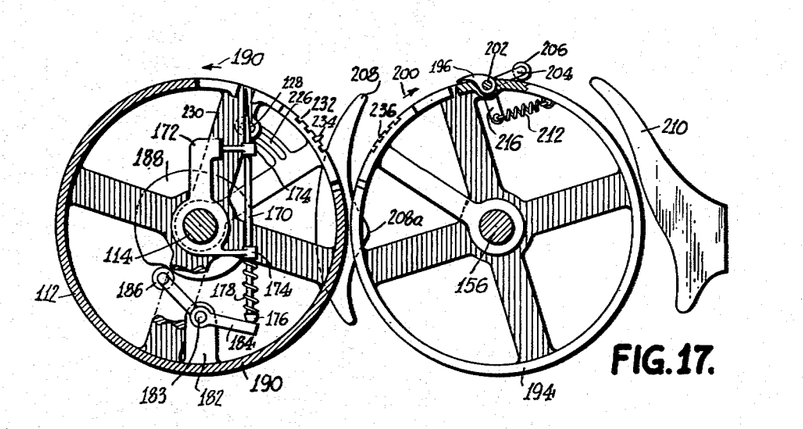
Fig. 17 is a view similar to that of Fig. 16, showing one of the gripping elements in retracted position.
Figure 18:
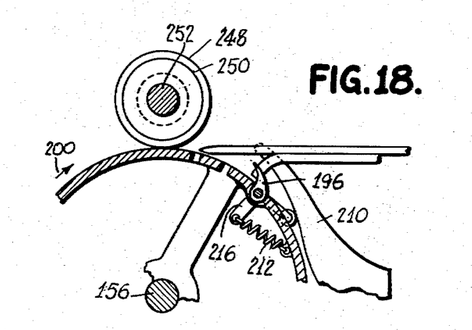
Fig. 18 is a fragmentary sectional view, showing the other of the gripping elements in open or inoperative position.

The mechanism which actuates the gripper is clearly shown in Figs. 16 and 17. It will there be seen that gripper 196 is fixed to a shaft 202 to which an arm 204 is also fixed. Gripper 196, shaft 202 and arm 204 cooperate with each other in the manner of a bell crank and they may be considered to constitute a bell crank. Arm 204 carries a cam follower 206 which is engageable with two separate spaced cams 208 and 210, respectively. These cams may be adjustably mounted so as to change their positions relative to each other and relative to the other components of the machine to which they are functionally linked. Fig. 16 shows the cam follower 206 in engagement with cam 208. The cam follower is held in tensioned engagement with the cam by means of tension spring 212, which is attached at one end to a ring 214 on the inside of roller 194 and which is attached at its opposite end to an arm 216 on shaft 202. The combination of arms 204 and 216 and shaft 202 constitutes, in effect, a bell crank, so that the action of the spring on arm 216 urges the cam follower on arm 204 to ride against cam 208. By the same token, the combination of arm 216, shaft 202 and gripper 196 is also a bell crank arrangement wherein spring 212, acting upon arm 216, tends to hold the gripper 196 in tensioned engagement with the peripheral surface of roller 194. It will be noted in Fig. 17 that cam 208 has a high spot 208a and two low sides flanking said high spot. When the cam follower engages the low sides of cam 208, as witness Fig. 16, the cam pressure on the cam follower is insufficient to relieve the tensioned pressure which the gripper exerts, either upon roller 194 proper, or upon tab 52 which may be interposed between said gripper and said roller. As the cam follower approaches high spot 208a, however, increased cam pressure is applied to the cam follower and consequently, the action of spring 212 is overcome and the gripper is moved away from the roller to open or inoperative position.

It has been stated that pointed pins 170 engage the top end of paper tube 40 and carry the tube up into the space which separates rollers 112 and 194. Tab 52 is thereby brought into engagement with gripper 196 at the very moment that cam follower 206 engages the high spot on cam 208. It is, at this time, that the gripper is in open position and ready to receive the tab in the space which separates said gripper from the outer peripheral surface of the roller. The cam follower then rides off the high spot on the cam and the pressure of the cam upon the cam follower diminshes to the extent necessary to allow spring 212 to take over and to cause the gripper to grip the tab 52 against the peripheral surface of the roller. Since the tab is attached to side wall 62 of the paper tube and not to side wall 60 thereof, the effect of this gripping action upon the tab, in combination with the pinning action of pointed pins 170, and the opposite rotation of the two rollers 112 and 194, is to cause the paper tube to open up in the manner shown in Figs. 19 and 20, the gripper pulling wall 62 in one direction and the two pins pulling wall 60 in the opposite direction.

Rollers 112 and 194 perform another function in addition to the function of opening up the top of the paper tube. It will be noted that a sector 218 is provided in a cut-out 220 in roller 112 and that a corresponding sector 222 is provided in a corresponding cut-out 224 in roller 194. Sector 218 is rotatably mounted on shaft 114 and it is provided with a slotted arcuate arm 226 which is adjustably secured by means of a screw 228 to spoke 230 of roller 112. It is by this means that sector 218 may be adjustably positioned in an angular sense relative to shaft 114 and roller 112. Sector 222 may also be adjustably mounted for selective angular positioning relaive to shaft 198 and roller 194. The same adjusting means may here be provided as sector 218 is shown to have. It will be seen that sector 218 is provided with a plurality of spaced, parallel notches 232, any one of which is adapted to receive and hold a scoring blade 234. Corresponding notches 236 are formed in sector 222, and it will be understood that the two sectors may be adjusted relative to each other in such manner that their respective notches will register with each other, when the two rollers bring them opposite each other. When such registration takes place, and reference is here made particularly to registration of scoring blade 234 with corresponding notch 236, score line 58 will be formed in paper tube 40. The location of the score line is determined by the location of the scoring blade, and it will be understood that the scoring blade may be mounted in any one of the four notches or slots 232, shown in the drawing.

It will be seen from the foregoing that rollers 112 and 194 not only carry the paper tube forwardly and upwardly, but they also form score line 58 and, at the same time, they begin the process of opening up the top of the paper tube preparatory to arriving at the bag-making stage illustrated in Figs. 5 and 6. The tube-opening process is clearly shown in Figs. 19 to 22, inclusive. It will there be seen that pointed pins 170 pull the top end of side wall 60 in one direction, at the same time that gripper 196 pulls the top end of side wall 62 in the opposite direction. When the paper tube is opened to the extent shown in Fig. 20, the upper corners of the tube tend to pull inwardly and toward each other. This condition is clearly shown in Figs. 21 and 22 where the corners are designated by means of the reference characters 64 and 66, respectively. Shortly before the stage illustrated in Fig. 21 is reached, pointed pins 170 are retracted into roller 112 and they thereby disengage and release the paper tube. Gripper 196, however, remains clamped upon tab 52 until a later stage in the process is attained. It will be noted in Fig. 21 that a pair of arms 238 and 240, respectively, project upwardly from shaft 114, on both sides or at both ends of said roller 112. These two arms are fixed against rotation with said shaft and they are always maintained in the positions which they are shown to occupy in Fig. 21. Arms 238 and 240 support a bar 242 which extends longitudinally of roller 112, parallel to shaft 114. Adjustably mounted on bar 242 are two presser arms 244 and 246, respectively. These presser arms may comprise a pair of leaf springs and they are positioned to exert a pressing action upon the outwardly pulled portion of side wall 60 of the paper tube. The effect of this pressing action is to fold that portion of side wall 60 which lies above score line 58 over and back upon that portion of said wall which lies below said score line. The result of this action is shown in Fig. 5.

Figure 22:
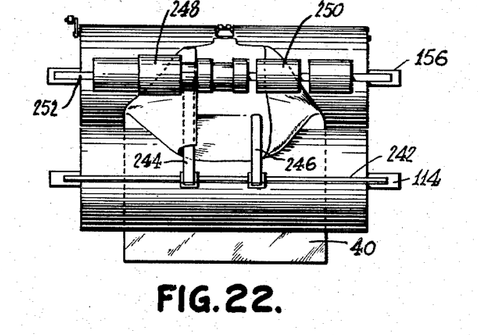
Fig. 22 is a top view of the mechanism and stage of operations shown in Fig. 21.

It has been stated that corners 64 and 66 of the paper tube fold inwardly and toward each other, at the same time that the top portion of side wall 60 is folded over along score line 58. Means are provided for pressing these inwardly turned or folded corners until they lie flat upon the tube in the manner shown in Fig. 5. These pressing means comprise a relatively large roller 248 and a relatively small roller 250 which are mounted on shaft 252. Shaft 252 is maintained at all times in the position which it is shown to occupy in Figs. 19 to 22, inclusive. It extends longitudinally of roller 194 and it is parallel to shaft 193. It will be noted in Figs. 12 and 21 that a curved guide plate 254, supported by a rod 256, tends to flatten out the inwardly turned or folded corner 64 preparatory to the pressing action upon said corner of roller 248. This roller presses the corner down flat as Fig. 22 shows and a pair of sharply accentuated folds or creases 68 and 70 result. Roller 250 engages the inwardly turned or folded corner 66, also as Fig. 22 clearly shows, and it also folds said corner flat upon the paper tube. But inasmuch as roller 250 is somewhat smaller in diameter than roller 248, the pressing operation which it performs does not actually crease folds 72 and 74 of corner 66 to the same extent as folds 68 and 70 are creased. The reason is that folds 68 and 70 are permanent, at least as long as the bag-making process endures. Folds 72 and 74, on the other hand, are temporary and as Fig. 8 clearly shows, they disappear in that stage of the bag-making process which results in the condition shown in Figs. 8 and 11.

It is the rotation of roller 194 in the direction of arrow 200 that carries the paper tube forwardly between the two rollers (Figs. 16, 17, 19). When roller 194 reaches the position which it is shown to occupy in Fig. 18, cam follower 206 engages cam 210 and causes gripper 196 to open against the action of spring 212. This releases tab 52 of the paper tube and the tube is thereby rendered free to continue its forward movement.

Figure 23:
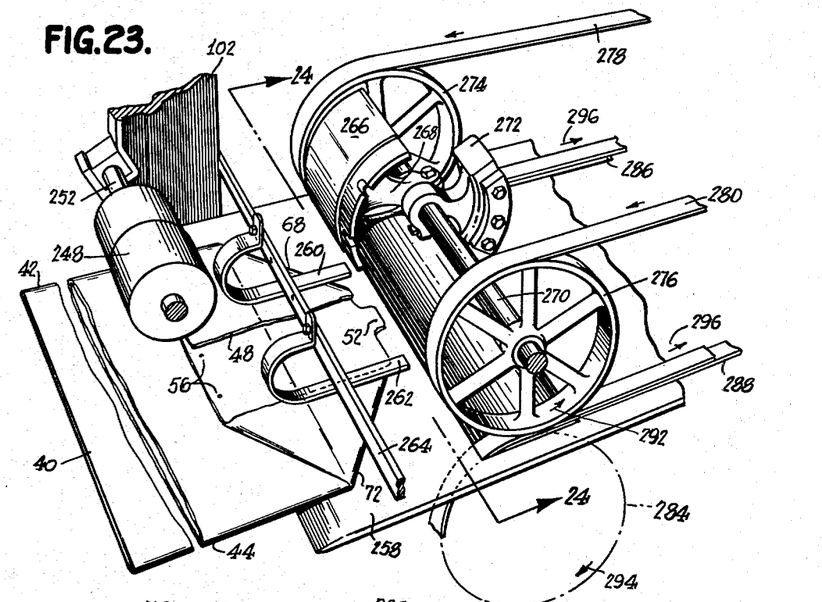
Fig. 23 is a fragmentary perspective view, illustrating the second section or component of the machine wherein the final pressing or creasing operation takes place in order to produce the result illustrated in Fig. 5.
Figure 24:
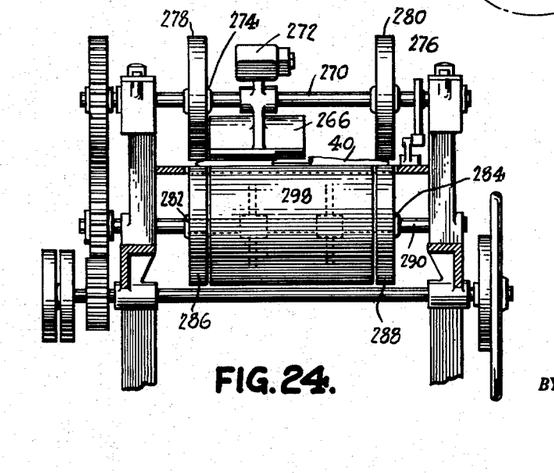
Fig. 24 is a sectional view on the line 24—24 of Fig. 23.

Turning now to Figs. 23 and 24, it will be seen that after the paper tube passes between rollers 248 and 250, on the one hand, and roller 194, on the other hand, it moves upon table 258 and it is held flat upon said table by means of a pair of presser feet 260 and 262, respectively. These presser feet are simply curved bars or leaf springs which are supported by fixed bar 264. Bar 264 is parallel to shaft 252 and both are supported on frame 102 of the machine as Fig. 23 clearly shows. Presser foot 260 engages folded corner 64 of the paper tube and presser foot 262 engages corner 66.

The next element of the bag-making machine which the paper tube encounters is an arcuate presser 266 which is supported by a bracket 268 on shaft 270. A counter-weight 272 is also provided on said shaft 270 diametrically opposite arcuate presser plate 266. The function of presser plate 266 is to further emphasize or crease folded edges 68 and 70 of folded corner 64. There is no corresponding presser plate on the other side of the machine to act upon folded edges 72 and 74 of corner 66.

It will be noted that wheels or pulleys 274 and 276 are secured in spaced relation to each other to shaft 270. The distance between these two wheels or pulleys is exceeded by the width of the paper tube so that as the tube is carried under said wheels or pulleys, the side edges of said tube are engaged by said wheels or pulleys as Fig. 24 clearly shows. An endless belt 278 is mounted on pulley 274 and an endless belt 280 is mounted on pulley 276. It will be understood, therefore, that it is actually the belts themselves, rather than the pulleys on which they are mounted, that engage the side edges of the paper tube. Immediately below pulleys 274 and 276 is another pair of pulleys 282 and 284, respectively, on which are mounted endless belts 286 and 288, respectively. Pulleys 282 and 284 are mounted on a shaft 290 which lies directly below and parallel to shaft 270. When the paper bag is carried forwardly from its position in Fig. 23, it moves between the upper and lower belts as Fig. 24 clearly shows, and it is then carried forwardly by said belts through the remaining stages of the bag-making process. The direction of rotation of upper pulleys 274 and 276 is indicated by arrow 292 and the direction of rotation of lower pulley 282 and 284 is in the direction of arrow 294. The lower reach or run of belts 278 and 280 travels in the direction of arrow 296 as does the upper reach or run of belts 286 and 288. It is by means of these portions of the several belts that the paper tube is carried forwardly through the remaining stages of the process. It will be noted that mounted between pulleys 282 and 284 is a roller 298. The function which this roller performs is to support the moving paper tube during the creasing stage of the process in which arcuate presser plate 266 creases folded edges 68 and 70 of corner 64 of the paper tube.

Figures 25, 26, 27:
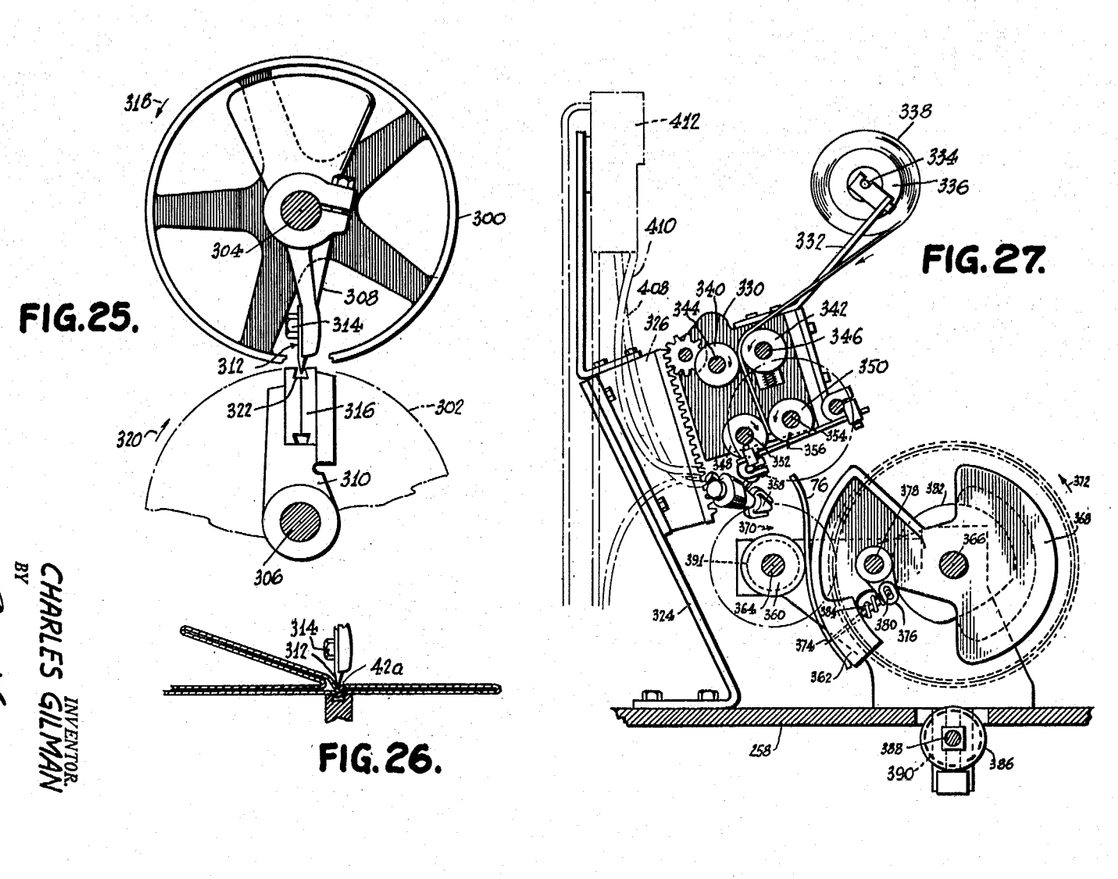
Fig. 25 is a fragmentary sectional view, illustrating the third section or component of the machine wherein the creasing operation illustrated in Fig. 6 takes place.
Fig. 26 is a fragmentary sectional view, showing the crease-making step which is illustrated in Fig. 6.
Fig. 27 is a sectional view through the fourth section or component of the machine, wherein the valve flap is cut and secured to the tube, as illustrated in Fig. 7.

The next stage of the bag-making process is illustrated in Figs. 6, 25 and 26. The paper tube is carried forwardly by the several belts, above mentioned to the station represented by rollers 300 and 302, mounted respectively, on shafts 304 and 306. A bracket 308 is adjustably secured to shaft 304 and a second bracket 310 is adjustably secured to shaft 306. A scoring blade 312 is adjustably secured to bracket 308 by means of screw or screws 314 and a grooved member 316, adapted to receive the scoring blade, is secured to bracket 310. Shaft 304, bracket 308 and roller 300 rotate in the direction of arrow 318 and roller 302, bracket 310 and shaft 306 rotate in the direction of arrow 320. The two brackets are positioned on their respective shafts in such manner that scoring blade 312 registers with groove 322 in grooved block 316, when the shafts reach their Fig. 25 positions. It is, at this time, that the folded paper tube reaches the position which it is shown to occupy in Fig. 26. Scoring blade 312 engages the paper tube and forms score line 42a, shown in Fig. 6. The paper tube is now ready for the next stage of operations.

The paper tube is now carried to the station, shown in Fig. 27 where the valve flap 76 is applied. A bracket 324 is mounted on table 258 and a block 326 is mounted on said bracket. A frame 330 is supported by block 326 and a bracket 332 is supported by said frame 330. At the top of bracket 332 is a shaft 334 which carries a reel 336 of gummed paper tape 338. This tape, which eventually becomes valve flap 76 when it is cut to predetermined lengths, is fed downwardly in the manner shown in Fig. 27. It passes between a pair of rollers 340 and 342, mounted on shafts 344 and 346, respectively. The gummed tape continues downwardly and passes between another pair of rollers 348 and 350, respectively, mounted on shafts 352 and 354. The directions of rotation of the four rollers last mentioned, are indicated by the curved arrows on said rollers in Fig. 27. As the rollers rotate in the directions shown, they feed the gummed tape downwardly to the station where it is moistened preparatory to its application to the paper tube.

Roller 350 is a drive roller which carries the burden of drawing the gummed tape from the roll of tape and feeding it downwardly. Rollers 340 and 348 may also constitute drive rollers to facilitate feeding the gummed tape. Mounted on roller 350 is a cut-off blade or knife 356 which may be serrated. This cut-off knife cuts the gummed tape to predetermined lengths, and it operates once on each complete revolution. The gummed tape is fed past a spray nozzle 358 which sprays the tape with water under air pressure. The leading end of the moistened tape is then engaged between a roller 360 and an arcuate pressing sector 362. Roller 360 is mounted on a shaft 364 and sector 362 is mounted on a shaft 366. A counter-weight 368 is provided for the sector. Arrow 370 indicates the direction of rotation of roller 360 and shaft 364, and arrow 372 indicates the direction of rotation of shaft 366 and sector 362. To insure a positive feed of the cut length of tape to the station where it is applied to the paper tube, a pair of pins 374 are provided in sector 362. These pins are secured to arms 376 which are mounted on shaft 378 carried by the sector. A cam follower 380 is provided on arms 376 and said cam follower rides on a fixed cam 382. A compression spring 384 is mounted on each pin 374 between arms 376 and sector 362. The action of these springs is to retract pins 374 and these pins are retracted when the cam follower 380 engages the low side of cam 382. When it engages the high side of said cam, however, the pins are thrust forward against the action of springs 384 and into engagement with the moistened tape. (See Fig. 27.)

The moistened tape is applied to the paper tube when the tube passes between sector 362 and roller 386 as Fig. 27 clearly shows. Roller 386 is mounted on shaft 388 and it is provided with annular grooves 390 to accommodate the pointed ends of pins 374. It may be here stated that roller 360 is correspondingly grooved to accommodate the same pins. The annular grooves formed in roller 360 are designated by means of the reference character 391. As the paper tube moves between said grooved roller 386 and arcuate pressing sector 362, the moistened tape is applied to the tube as Fig. 7 clearly shows. The reference character 76 in Fig. 7 indicates the valve flap which is simply a predetermined length of gummed tape 338 applied to the paper tube.

Spray nozzle 358 is supported on a holder 392 which is mounted on a bar 394. This bar is supported by clamps 396 and 398 which are mounted on rod 400. Clamp 402 and a second clamp 404 secure rod 400 to rod 406. Bar 394 is longitudinally and angularly adjustable in clamp 396 and clamp 398 is adjustable longitudinally and angularly of rod 400. Clamps 402 and 404 render rod 400 adjustable longitudinally and angularly of rod 406. Hence, the spray nozzle may be shifted to any desired location relative to the gummed tape so as to focus its spray in the right direction and at the right place.

A water hose 408 and an air hose 410 are connected to spray nozzle 358. The water hose is connected to a water tank 412 and the air hose is connected to a valve 414 which, in turn, is connected to a source of compressed air (not shown) through hose 416. It will be noted in Fig. 29 that valve 414 is mounted adjacent a wheel 418. Adjustably mounted on this wheel is a pair of arcuate valve control plates or cams 420 and 422, respectively. Cam plate 420 is situated for engagement with what may be described as cam follower 424 on valve 414. Wheel 418 is mounted on shaft 426 and both the wheel and the shaft engage in rotary movement in the direction of arrow 428. When the wheel is in the position which it is shown to occupy in Fig. 29, arcuate cam plate 420 engages cam follower 424 and valve 414 is thereby opened. A rush of compressed air takes place through hose 410 and the water is forced out of the nozzle in the form of a spray. Valve 414 automatically closes when arcuate cam plate 420 moves out of engagement with cam follower 424. Arcuate cam plate 422 performs the same function with respect to cam follower 430 on air valve 432. A hose 434 connects said valve 432 to a source of air under pressure and a second hose 436 connects said valve 432 to a second nozzle 438 (Fig. 34) for a purpose which will shortly appear.

The paper tube 40 is now in the condition of Fig. 7. In the next stage of the process herein claimed, two events take place. In the first place, the folded end of side wall 60 is brought out of folded position as shown in Fig. 7 and returned to unfolded position as shown in Fig. 8. In the second place, folded corner 66 is returned to its original unfolded position as shown in Fig. 8. The first operation is mechanical in the sense that a lifting plate 440 is inserted underneath the folded end of side wall 60 to lift said folded end into unfolded position. The second operation may be described as a blowing operation in the course of which a blast of compressed air is blown into the folded corner 66 to blow it into unfolded position.

Figure 34:
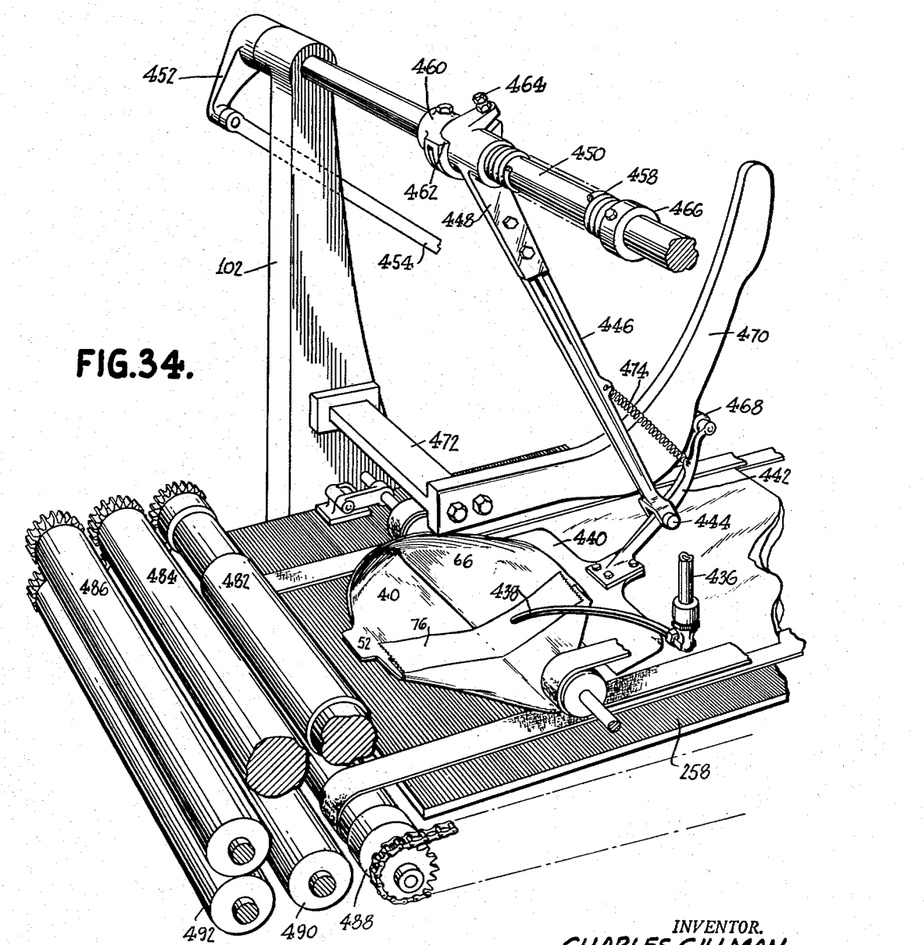
Fig. 34 is a fragmentary perspective of said fifth section or component of the machine in substantially the same position illustrated in Fig. 31.

Taking the second operation first, it will be seen in Fig. 34 that the blowing operation takes place through the instrumentality of nozzle 438. When arcuate cam plate 422 engages cam follower 430, it opens valve 432 and causes a blast of air to issue from nozzle 438 into the inside of folded corner 66 under sufficient pressure to open said folded corner and to return it to its original unfolded position.

Referring now to the lifting operation above mentioned, it will be seen that lifting plate 440 is mounted on a rocking arm 442 which is pivotally supported intermediate its ends by means of pin 444 on arm 446. The lower end of arm 446 is bifurcated to receive rocking arm 442 as Fig. 34 clearly shows. The top end of arm 446 is fastened to a bracket 448 which is adjustably secured to a shaft 450. It will be noted that shaft 450 is supported by the frame 102 of the machine and that a crank arm 452 is secured to one end of said shaft. A drive rod 454 is attached at its upper end to crank arm 452; at its lower end, it is attached to an eccentric 456. The eccentric causes the drive rod 454 to engage in reciprocating movement and this reciprocating movement is transmitted through crank arm 452 to shaft 450. It is then transmitted through said shaft to arm 446 and through said arm to the lifting plate 440.

The manner in which and the means by which the reciprocating angular movement of shaft 450 is transmitted to arm 446 are not critical. The simplest way would be to fixedly secure bracket 448 to shaft 450 so that said bracket and said shaft will move integrally with each other. Another way would be to allow the shaft to move relative to the bracket and to provide a torsion spring 458 which would be fixed at one end to the shaft and at its opposite end to the bracket. The reciprocating movement of the shaft would thereby be transmitted to the bracket through the torsion spring. A third way would be to mount bracket 448 loosely upon the shaft and to fix a collar 460 to said shaft immediately adjacent the bracket. Collar 460 has an offset portion or shoulder 462 which is engageable with a stud 464 on bracket 448. When shaft 450 turns in one direction, shoulder 462 will engage stud 464 and cause bracket 448, and with it arm 446, to turn in the same direction. So far as movement of bracket 448 and arm 446 in the opposite direction is concerned, gravity may be ample to perform the function of returning said bracket and said arm to their original positions. In such case, torsion spring 458 would serve solely as a frictional element to dampen or slow down the gravity-actuated movement of bracket 448 and arm 446. One end of the spring would bear against bracket 448 and the opposite end would bear against collar 466 which is fixed to shaft 450.

It will be seen in Fig. 34 that lifting plate 440 is secured to one end of rocking arm 442. At the opposite end of the rocking arm is a cam follower 468 which rides upon a fixed cam 470. It will be noted that fixed cam 470 is secured to a bracket 472 which is mounted on frame 102 of the machine. A tension spring 474 is attached at one end to rocking arm 442, between its fulcrum 444 and cam follower 468, and it is attached at its opposite end to arm 446, a spaced distance above said fulcrum 444. The action of this spring is to hold the cam follower in uninterrupted engagement with the cam.

The action of the lifting plate is shown in Figs. 30 to 33, inclusive. At the start of one complete cycle or stroke, the lifting plate is in its elevated position, shown in Fig. 30. Its movement is downward in the direction of arrow 476 and it is also arcuate about the longitudinal axis of shaft 450. This movement continues until the lifting plate slips under the folded top end of side wall 60 of the paper tube. (See Fig. 31.) Cam follower 468 now engages prominence 478 of cam 470 and rocking arm 442 is caused to engage in counter-clockwise movement about fulcrum 444 as viewed in Fig. 32. This tends to elevate the lifting plate as it moves forwardly and it thereby unfolds the folded top end of said side wall 60. In the final stage of this operation, cam follower 468 rides off prominence 478 and rocking arm 442 is thereby caused to engage in clockwise movement about its fulcrum 444 under the influence of spring 474. The lifting plate is thereby brought downwardly to help flatten out the now unfolded top end of side wall 60. It should be remembered that as this process takes place, the paper tube moves continuously forwardly in the direction of arrow 480 in Fig. 30. Arm 446 now swings backwardly to its Fig. 30 position and one complete stroke or cycle is at an end.

Figures 28, 29:
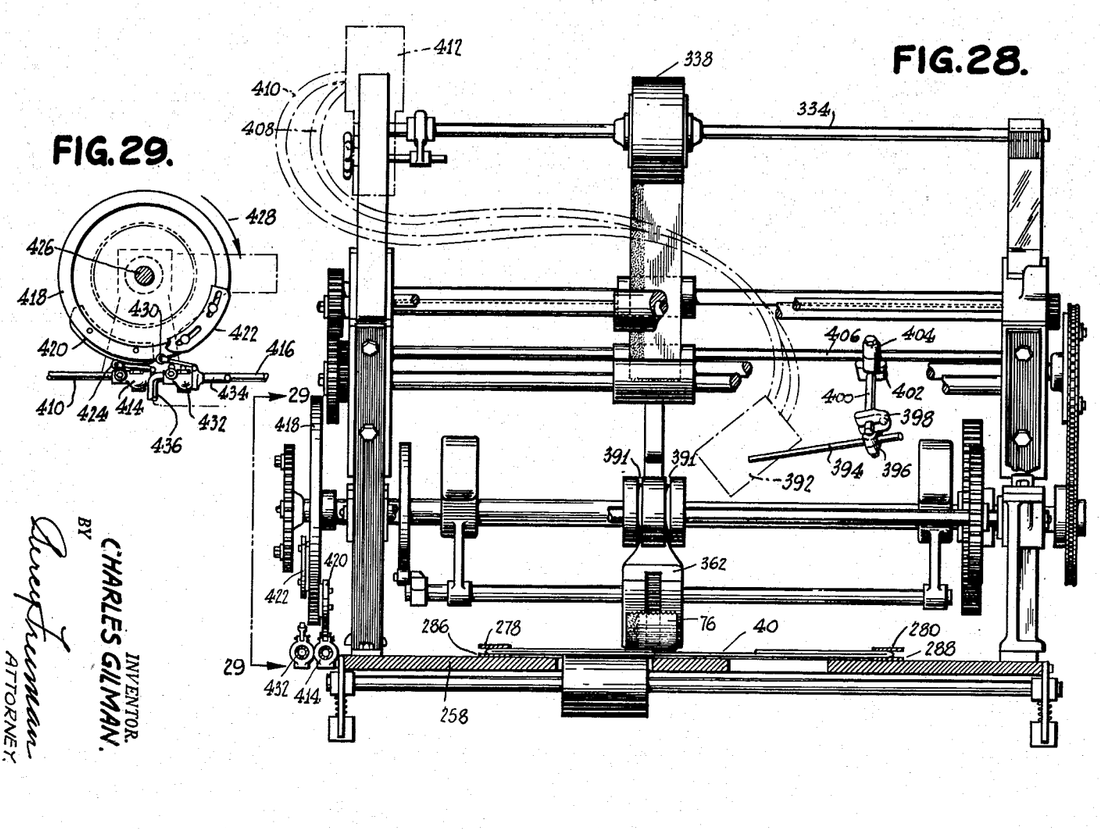
Fig. 28 is a sectional view on the line 28—28 of Fig. 1.
Fig. 29 shows the valve actuating means for controlling the flow of compressed air to the valve flap applying means and to the tube opening means which produces the condition shown in Fig. 8.
Figure 30:
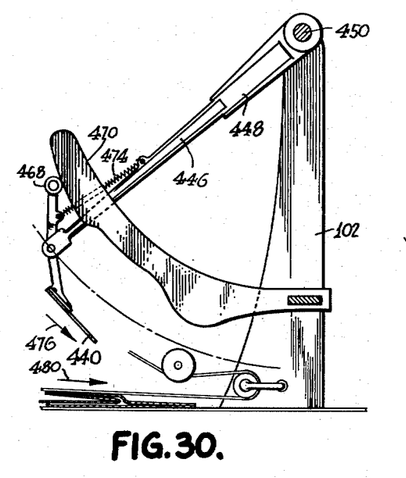
Fig. 30 is a fragmentary view, illustrating the fifth section or component of the machine, wherein the folded side of the tube is lifted into unfolded position, as illustrated in Fig. 8.
Figure 31:
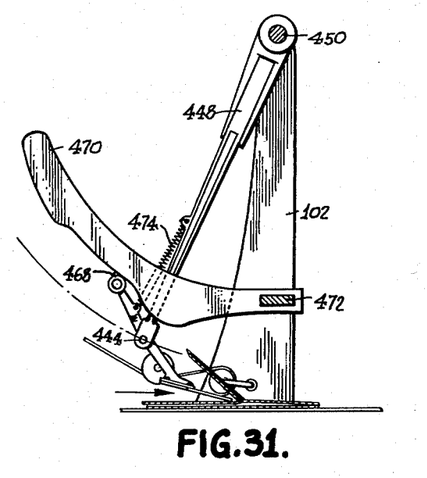
Fig. 31 shows a second position of said lifting means.
Figure 32:
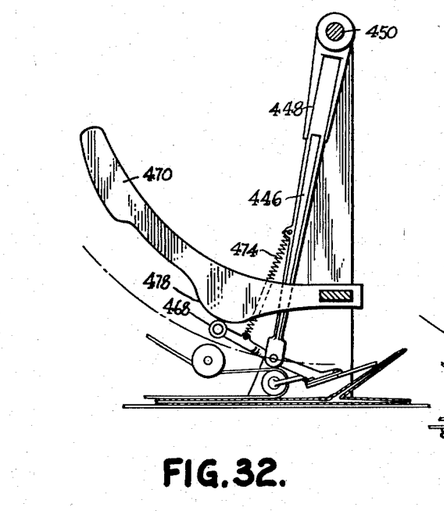
Fig. 32 shows a third position of said lifting means.
Figure 33:
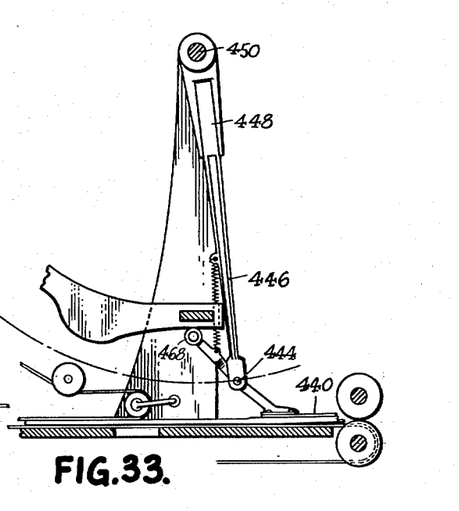
Fig. 33 shows the fourth and final position of said lifting means.

It will be understood that when the unfolding process reaches the intermediate stage, illustrated in Figs. 29 and 34, valve 432 opens and a blast of air issues forth from nozzle 438 and into the partly opened and partly closed corner 66 of the paper tube. This blast of air has the effect of completely opening said corner and returning it to its unfolded position. (See Fig. 8.) Once this is done, the stage shown in Fig. 32 follows and then the final stage shown in Fig. 33.

The paper tube 40 now leaves the machine preparatory to the taping and sewing operations which close the ends of the tube to complete the bag. The endless belts 278, 280, 286 and 288 continue to carry the tube to upper rollers 482, 484, 486, and lower rollers 488, 490 and 492, respectively. It will be understood that the paper tube passes between the upper and lower rollers in order to receive the final pressing force required to emphasize and crease the folded edges shown in Fig. 8. The tube is now complete and ready for the taping and sewing operations above mentioned. It may here be stated that tab 52 which played such a prominent role in the process above described now performs an equally important part in strengthening the upper end of the bag. It will be understood that tab 52 is folded over upon side wall 60 at the time tape 84 is applied and sewed to the top end of the tube and the same stitching which secures said tape to said tube, also secures tab to side wall 60 of the tube. Although only one tab is shown in the drawing, it will be understood that more than one tab may be used purely for reinforcing purposes.

Figure 13:
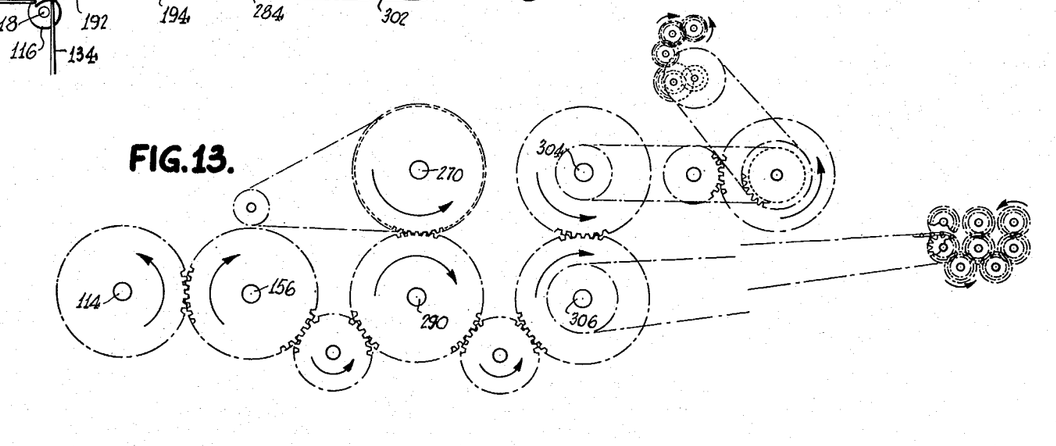
Fig. 13 is another diagrammatic view of said machine, showing the gears and gear chains which drive the same.

The operating mechanism or driving mechanism by which the machine above described is operated is shown diagrammatically in Fig. 13. It will there be seen that the several shafts of the machine are geared to each other for synchronization of their respective movements.

Having thus described my invention, what I claim as new and desire to secure by Letters Patent, is:

1. A method of making a valve bag of the gussetless type which comprises the following steps: scoring a flat paper tube transversely of itself a spaced distance below its intended valve end, folding that portion of one side wall of said tube which lies between said end and the score line back upon the remaining portion of said side wall which lies on the other side of said score line and simultaneously folding the corners of said tube inwardly and upon the folded portion of said last mentioned side wall as well as upon the corresponding portion of the other side wall, applying a valve flap to the inner edge of only one of said inwardly folded corners, returning the folded portion of the first mentioned side wall to its original unfolded position and, at the same time, leaving the last mentioned folded corner in folded position and returning the other folded corner to its original unfolded position, and then closing the two ends of the paper tube by securing a binding to each end.

2. A method of making a valve bag of the gussetless type which comprises the following steps: scoring a flat paper tube transversely of itself a spaced distance below its intended valve end, folding that portion of one side wall of said tube which lies between said end and the score line back upon the remaining portion of said side wall which lies on the other side of said score line and simultaneously folding the corners of said tube inwardly and upon the folded portion of said last mentioned side wall as well as upon the corresponding portion of the other side wall, creasing the folded edges of one of said folded corners to flatten said folded corner upon the two side walls, scoring said folded corner on a transverse line which substantially coincides with the first score line, applying a valve flap to said inwardly folded and scored corner along its inner edge, returning the folded portion of the first mentioned side wall to its original unfolded position and, at the same time, folding the inwardly folded and scored corner along the second score line to fold said inwardly folded corner flat upon itself, and simultaneously returning the other folded corner to its original unfolded position, and then closing the two ends of the paper tube by binding each end.

3. In a bag-making machine, wherein valve bags of the gussetless type are made from flat paper tubes, scoring means for transversely scoring a paper tube a spaced distance from its intended valve end, a folding means which folds that portion of one side wall of the paper tube which lies between said end and the score line back upon the remaining portion of the same side wall which lies on the other side of said score line, whereby the two top corners of the tube are folded inwardly, simultaneously therewith, upon the folded portion of said last mentioned side wall and upon the corresponding portion of the other side wall, means for applying a length of gummed paper tape to the inner edge of only one of said folded corners, lifting means for lifting the folded portion of the first mentioned side wall back to its original unfolded state, and a blower which blows a current of air into the other folded corner to blow it out to its original unfolded state.

4. In a bag-making machine in accordance with claim 3, wherein the lifting means comprises a shaft mounted for oscillatory angular movement, a downwardly projecting arm which is connected at its upper end to said shaft, a rocking arm which is connected to the lower end of said arm, a lifting plate which is secured to one end of said rocking arm, a cam follower which is mounted at the other end of said rocking arm, and a fixed cam which said cam follower engages to cause the rocking arm and the lifting plate to rock at the same time that the angular movement of the shaft causes said first mentioned arm, said rocking arm, said lifting plate and said cam follower to engage in angular movement about the axis of said shaft.

References Cited in the file of this patent

UNITED STATES PATENTS

| Number | Name | Date |
|---|---|---|
| 1,527,467 | Bushbaum | Feb. 24, 1925 |
| 1,583,392 | Coty | May 4, 1926 |
| 1,780,720 | Redington | Nov. 4, 1930 |
| 2,189,847 | Verwys | Feb. 13, 1940 |
| 2,265,075 | Knuetter | Dec. 2, 1941 |
| 2,296,146 | Crawford | Sept. 15, 1942 |
| 2,559,873 | Grupe et al. | July 10, 1951 |